(12) United States Patent
Desharnais et al.

(10) Patent No.: US 7,297,245 B1
(45) Date of Patent: Nov. 20, 2007

(54) ELECTROKINETIC METHODS AND APPARATUS FOR COLLECTION OF IONIC CONTAMINANTS

(75) Inventors: Brian Matthew Desharnais, Angola, IN (US); Barbara Ann G. Lewis, Evanston, IL (US)

(73) Assignee: Northwestern University, Evanston, IL (US)

( * ) Notice: Subject to any disclaimer, the term of this patent is extended or adjusted under 35 U.S.C. 154(b) by 527 days.

(21) Appl. No.: 10/361,458

(22) Filed: Feb. 10, 2003

Related U.S. Application Data

(60) Provisional application No. 60/355,575, filed on Feb. 8, 2002.

(51) Int. Cl.
*B01D 61/48* (2006.01)
(52) U.S. Cl. ............... 204/517; 204/524; 204/630; 204/632
(58) Field of Classification Search .......... 204/517, 204/524, 630, 632
See application file for complete search history.

(56) References Cited

U.S. PATENT DOCUMENTS

| | | | |
|---|---|---|---|
| 2,815,320 A | * | 12/1957 | Kollsman ............... 204/524 |
| 3,149,061 A | * | 9/1964 | Parsi ..................... 204/517 |
| 3,291,713 A | * | 12/1966 | Parsi ..................... 204/524 |
| 5,405,509 A | | 4/1995 | Lomasney et al. |
| 5,489,370 A | | 2/1996 | Lomasney et al. |
| 5,503,031 A | | 4/1996 | Scott et al. |
| 5,876,590 A | | 3/1999 | Snyder et al. |
| 5,914,020 A | | 6/1999 | Griffith et al. |
| 6,193,867 B1 | | 2/2001 | Hitchens |
| 6,203,682 B1 | | 3/2001 | Hodko |
| 6,210,078 B1 | | 4/2001 | Redwine et al. |
| 6,210,955 B1 | | 4/2001 | Hayes |
| 6,221,237 B1 | | 4/2001 | Lindgren et al. |
| 6,228,247 B1 | | 5/2001 | Griffith et al. |
| 6,241,872 B1 | | 6/2001 | Marks et al. |

OTHER PUBLICATIONS

Harrington, David K., "A Faster Way to Collect Subsurface Samples; This hydraulic probe collects soil and groundwater samples with minimal surface disturbance." Chemical Engineering. New York: Mar. 1996, vol. 103, Iss. 3; p. 147, 7 pgs. Copyright 1998 The McGraw-Hill Companies.

(Continued)

*Primary Examiner*—Arun S. Phasge
(74) *Attorney, Agent, or Firm*—Reinhart, Boerner, Van Deuren, S.C.

(57) ABSTRACT

An electrokinetic method and apparatus for discretely collecting ionic contaminants from a variety of media, with an ionic current there across in which an ion collection compartment has been positioned. Each compartment preferably compromises of an anion or cation exchange membrane and a solution that provides an accumulation zone for ions that permeate into the compartment. After the collection period, the solution is extracted from the compartment, and the concentration of ionic contaminants is determined using standard analytical methods. The preferred apparatus embodiment for use in conjunction with such a method has a direct-push probe configuration. The apparatus can be used (a) to detect low concentrations of ionic contaminants, (b) to evaluate cleanup efficiencies, and (c) to monitor the transport of ionic contaminants.

33 Claims, 11 Drawing Sheets

OTHER PUBLICATIONS

Ottosen, L.M.; Hansen, H.K.; Hansen, C.B. "Water splitting at ion-exchange membranes and potential differences in soil during electrodialytic soil remediation," Department of Geology and Geotechnical Engineering, Building 204, Technical University of Denmark, 2800 Lyngby, Denmark. Journal of Applied Electrochemistry 30: 1199-1207, 2000. Copyright 2000 Kluwer Academic Publishers.

Desharnais, Brian M.; Lewis, Barbara Ann G. "Electrochemical Water Splitting at Bipolar Interfaces of Ion Exchange Membranes and Soils." Soil Science Society of America Journal 66:1518-1525 (2002). Copyright 2002 Soil Science of America.

Acar, Yalcin B.; Alshawabkeh, Akram N. "Principles of Electrokinetic Remediation." Louisiana State University, Baton Rouge, LA 70803. Environ. Sci. Technol., vol. 27, No. 13, 1993. Copyright 1993 American Chemical Society.

Nystrom, Gunvor Marie. "Investigations of Soil Solution During Enhanced Electrodialytic Soil Remediation." Rappaport. BYG DTU R-009. 2001. ISSN 1601-2017. ISBN 87-7877-068-8.

Simons, R. "The origin and elimination of water splitting in ion exchange membranes during water demineralization by electrodialysis." R. Simons Department of Physics, The University of New South Wales, P.O.B. 1, Kensington, Sydney 2033 Australia. Desalination, 28(1979) 41-42. Elsevier Scientific Publishing Company, Amsterdam—Printed in The Netherlands.

Simons, R. "Water splitting in ion exchange members," R. Simons School of Physics, University of New South Wales, Post Office Box 1, Kensington, 2033, Australia. Electrochimica Acta, vol. 30, No. 3, pp. 275-282, 1985. Printed in Great Britain.

United States Environmental Protection Agency, Solid Waste and Emergency Response, "In Situ Remediation Technology Status Report: Electrokinetics", EPA 542-K-94-007, Apr. 1995.

\* cited by examiner

ELECTROKINETIC METHODS AND APPARATUS FOR COLLECTION OF IONIC CONTAMINANTS

This application claims priority benefit from provisional application Ser. No. 60/355,575 filed on Feb. 8, 2002, the entirety of which is incorporated herein by reference.

BACKGROUND OF THE INVENTION

The invention relates to the collection of ionic contaminants in media and, in particular, from soils of existing, suspected, or former hazardous waste sites. Specifically, the present invention utilizes the combined advantages of in situ probes, ion permeable components, and electrokinetic phenomena to discretely sample, collect and/or remove unwanted charged species from such media.

For the purposes of the present method and apparatus, the following expression(s) and word(s), unless otherwise indicated, will be understood as having the meaning(s) ascribed thereto by those skilled in the art and/or as otherwise indicated in respect thereto:

1. The word "medium" and the like (whether singular, plural or as a noun or adjective) includes but is not limited to soil, groundwater and/or surface water.

2. The word "soil" and the like (whether as a noun or adjective) includes but is not limited to unconsolidated matter (whether anthropogenic, natural, organic, or inorganic) such as sediment, sand, clay, slurry, mine tailings, and organic material;

3. The word "contaminated" and the like when used in relation to the word "soil" and the like shall be understood as referring to that portion of unconsolidated matter that is contaminated, in any way whatsoever, whether voluntarily or otherwise, and shall be understood as referring to that portion of a "medium" that is contaminated, in any way whatsoever, either voluntary or otherwise;

4. The expression "electrokinetic phenomena" and the like shall be understood as referring to the primary electrokinetic transport mechanisms of electrophoresis, electromigration, and electroosmosis that occur when a direct voltage is applied across electrodes placed in a soil mass. Electrophoresis is the movement of charged colloids (i.e., clay particles, micelles, organic particles, metal oxides) within the pore solution. Electromigration is the movement of ions to their respective electrodes. Electroosmosis (the transport of solutes in the pores of the soil due to the movement of the soil solution in an applied electric field) is particularly relevant here and bears some discussion. Double layer theory in soils postulates (a) the free water layer and (b) the boundary film of water within the diffuse electric double layer surrounding clay particles, organic colloids, and metal oxides. To maintain electroneutrality, counterions are associated with the charged particle surfaces. Under normal hydraulic flow, it is usually assumed that the boundary water film is not affected and only water within the free layer moves under the hydraulic gradient. (In actuality, the two water "layers" are a continuum, and the boundary between the layers is not clearly defined). Under the influence of an electric field, the counterions and their associated water molecules on the particle surfaces will migrate towards their respective electrodes. This movement imparts a net strain on the pore fluid around the hydration shell of the counterions, causing a net shear force to develop through the viscosity of the pore fluid. The net shear force and momentum cause the boundary film of water and free water to move. The thicker the diffuse double layer and the smaller the pore size, the more uniform is the strain field and the farther it extends into the center of the capillary. Because of the pore size effect, electroosmosis is only significant in low permeable soils. Also, since most soil surfaces have net negative charges, the movement of the pore solution due to electroosmosis is usually towards the cathode.

5. The words "hydrogen ion" and "proton" and the like (whether singular, plural or as a noun or adjective) include but are not limited to hydrated proton(s) and hydronium ion(s).

6. The expression "accelerated water splitting" and the like shall be understood as referring to the accelerated dissociation of water into hydrogen and hydroxide ions which occurs at bipolar interfaces between ion exchange membranes and low permeable soils. (See, Desharnais, B. M. and B. G. Lewis "Electrochemical Water Splitting at Bipolar Interfaces of Ion Exchange Membranes and Soils", Soil Science Society of America Journal, Vol. 66, no. 55 (2002); 1518-1525.) If an ion exchange membrane placed in contact with a soil has an electrostatic charge opposite in sign to the predominant charge on the soil colloidal particles, the interface is, in effect, bipolar. If an external electric field is then applied across the interface, conditions can give rise to accelerated water splitting, similar to the conditions found in bipolar ion exchange membranes. Accelerated water splitting occurs when the free pore solution in the low permeable soil moves away from the bipolar interfaces due to electroosmosis, thus causing an unsaturated zone at these interfaces. Accelerated water splitting then initiates at these interfaces since there are not enough counterions in contact with the IEMs to maintain an ionic current.

Sampling, collection, characterization, monitoring and/or removal are necessary and integral components of the cleanup of contaminated soils, aquifers, groundwaters and the like. Sampling and monitoring are used to evaluate the extent of contamination before remediation and the soil-cleanup efficiencies after remediation. The accurateness of this monitoring will dictate not only the type of remediation to be implemented but also the cleanup expense of the site. The prior art includes several techniques, the disadvantages of which have prompted the search for an improved apparatus and methodology, particularly for sampling and/or collecting low concentrations of cationic and anionic contaminants. Examples of such cationic contaminants include heavy metals over the range of encountered oxidation states (i.e., lead, mercury, cadmium, nickel, copper, zinc, and chromium), radioactive cationic species (i.e., radium, cesium, strontium, cobalt, and uranium), and hazardous organic cations (i.e., organic bases such as aniline and pyridine). Examples of such anionic contaminants include toxic anions (i.e., nitrates, chromates, and selenates) and hazardous organic anions (i.e., organic acids such as chlorophenols, nitrophenols, phenols, and cresols).

The majority of site explorations in the United States involve some form of media invasion, i.e., submersion, drilling or boring. In the context of contaminated soil cleanup, the creation of boreholes for soil sampling and the installation of monitoring wells and lysimeters for solution sampling all involve drilling. Of the many problems associated with drilling, a primary issue is the handling of contaminated cuttings. Direct contact with contaminated soils and solutions should be avoided to insure the health and safety of the workers. In extreme cases, it may be necessary to have full body coverage and separate air supplies. Risks are minimized if cuttings and fluids are minimized and small samples are collected. However, the tradeoff with small samples is the risk of not collecting a detectable or representative amount of the contaminant. Consideration should also be given to the contamination of the sampler and equipment, which may contaminate other samples. Second, drilling large boreholes and placing monitoring equipment such as lysimeters, pumps, and casings may significantly disturb the surrounding soil. A third problem is cost. Drilling and boring costs can range from about $66/m ($20/ft) to $3300/m ($1,000/ft) and higher. A fourth problem is ease of use. Drilling techniques such as hollow stem augers, direct rotary mud drilling, and core drilling may be complicated and time consuming. Pumping considerations, drilling fluid viscosities, and correct selection of rotary speeds and applied axial forces all significantly complicate drilling.

Disadvantages are also associated with media samplers. Again, in the soil context, as with all soil samplers (i.e., those which actually remove soil from the subsurface), the act of soil extraction may chemically and physically disrupt the soil sample. Likewise, some samplers do not collect representative samples. Studies have shown that suction lysimeters may collect samples that have a different chemical composition than the actual pore solution. In addition, the removal of the soil does not lend itself to repeatedly sample the same aquifer location again. Soil sampling is necessary, however, to measure the actual concentration of contaminants as no direct in-situ sampling techniques exist in the prior art. Further, very few samplers are effective in both the saturated and unsaturated zones. Aside from samplers that extract soil, few samplers are effective in low permeability clays and silts. Yet another problem is that some sampling techniques are time consuming. For example, suction lysimeters may require several days to fill.

The aforementioned concerns and deficiencies are discussed in the soil context, but comparable issues persist with other contaminated media, such as ground and surface water. Considering the above, there exists a need for innovative, accurate, and cost-effective monitoring sampling, collection and/or removal techniques.

SUMMARY OF THE INVENTION

Overcoming various shortcomings of the prior art, including those described above, the methods and apparatus described herein can be employed to discretely collect ionic contaminants from a variety of media, including saturated and unsaturated soils without drilling. The present invention mitigates disadvantages of existing sampling technologies and serves as an alternative to saturated sampling technologies (i.e., groundwater monitoring wells) and unsaturated sampling technologies (i.e., vacuum extraction techniques using porous cups), which are potentially hazardous to operators, time-consuming, difficult to install, and expensive to install. Accordingly, it is an objective of this invention to (a) detect or collect low concentrations of ionic contaminants, (b) evaluate cleanup efficiencies, and/or (c) monitor the transport of ionic contaminants within a given medium.

The present invention meets the preceding and various other objectives by providing a method and/or apparatus useful in conjunction therewith, which (a) incorporates push-driven methods and involves no drilling or contaminated cuttings, (b) is minimally invasive, (c) samples relatively large media/soil volumes, (d) is relatively easy to operate, (e) minimizes cross contamination of samples, (f) concentrates contaminants in comparison to existing extraction techniques, making low concentrations more detectable, (g) has flexible operability at selected sampling depths, (h) has reusable components, (i) avoids interfering chemical sealants or lubricants, and/or (j) functions in the saturated and unsaturated zones for a variety of soils possessing appreciable moisture contents.

More particularly, as further distinctions over the prior art, it is an object of the present invention to provide one or more methods and apparatus useful in conjunction therewith to (a) discretely collect ionic contaminants without an accompanying medium solvent component and/or (b) collect ionic contaminants under unsaturated media conditions.

It will be understood by those skilled in the art that one or more aspects of this invention can meet certain objectives, while one or more other aspects can meet certain other objectives. Each objective may not apply equally, in all its respects, to every aspect of this invention. As such, the aforementioned objects can be viewed in the alternative with respect to any one aspect of this invention.

Other objects, features, benefits and advantages of the present invention will be apparent from the summary together with the descriptions of certain embodiments following thereafter, and will be readily apparent to those skilled in the art having knowledge of various electrokinetic methods, techniques and related apparatus. Such objects, features, benefits and advantages will be apparent from the above as taken in conjunction with the accompanying examples, data, figures and all reasonable inferences to be drawn therefrom, alone or with consideration of the references incorporated herein.

In part, the present invention is a method of using ionic movement for discrete collection of a cationic contaminant. Such a method comprises (1) providing an anode contacting an aqueous cation source, the anode electrically-connected to a cathode contacting an aqueous electrolyte; (2) applying a voltage potential between the anode and cathode sufficient to reduce the cathodic electrolyte, oxidize the anodic water and move the anodic cation into an adjacent contaminated medium; and (3) collecting a cationic contaminant moved from the medium toward the cathode. The methods of this invention employ an electrolyte having a reduction potential greater than water. Further, the anode and cathode are proximate to the cation permeable component and in conducting contact with a cationic contaminated medium. In various embodiments of such a cationic collection method, the cathodic electrolyte comprises a protic acid. In conjunction therewith, the anodic aqueous cation source can also comprise a protic acid, whereby the anodic cation is hydrogen ion.

Several embodiments, among those described herein, employ a cathodic electrolyte comprising hydrochloric acid. Regardless of the protic acid identity, such an electrolyte has an aqueous concentration such that the Donnan potential of the cation permeable component is substantially unaffected. As is well known to those skilled in the art, the Donnan potential is the potential which inhibits co-ions from entering such a permeable component. (See, Overbeek, J. "The Donnan Equilibrium", Progress in Biophysics, 6 (1956); 57-84.) For example, the Donnan potential of a cation exchange membrane inhibits anions from entering/passing through such a component. Conversely, the Donnan potential of an anion exchange membrane inhibits cations from entering/passing therethrough. The Donnan potential decreases with increasing ionic strength of a contacting solution. The swelling of a typical ion exchange membrane remains constant up to concentrations of about 0.5N to about 1.5N. In higher concentrations, the osmotic pressure and Donnan potential decrease significantly. (See, Ion Exchange Membranes, Flett, D. S. (Ed), Chichester: Ellis Horwood, For the Society of Chemical Industry, 1983.) Even so, typical aqueous concentrations of a preferred hydrochloric acid cathodic electrolyte range from about 0.1N to about 0.2N.

As discussed more fully below, collection of a cationic contaminant can include a preliminary adjustment of pH and/or ionic conductivity of the contaminated medium. Such an adjustment/method comprises: (1) providing an anode contacting an aqueous hydrogen ion source, with the anode proximate a cation permeable component and a cathode proximate an anion permeable component, each electrode and conductive contact with the medium; and (2) applying a voltage potential between the electrodes sufficient to introduce anodic hydrogen ion and cathode anion into the medium. In conjunction therewith, the cathode contacts and electrolyte comprising a reducible cation and a non-hydroxide anion.

Such an adjustment is optional and, in a soil context, can be performed if low soil pH conditions are preferred or the ionic strength of the soil solution is too low to maintain an effective ionic current. As part of such a first step, two electrode components or compartments can be placed in contact with the soil. An acid solution, preferably but not limited to $HNO_3$, is placed in the component/compartment containing the anode (i.e., the anode compartment), and a cation permeable component separates this component/compartment from the soil medium. An acid solution, preferably but not limited to HCl, is placed in the component/compartment containing the cathode (i.e., the cathode compartment), and an anion permeable component separates this component/compartment from the soil. A direct potential is applied between the anode and the cathode causing positive or hydrogen ions to move into the soil from the anode compartment and negative or chloride ions to move into the soil from the cathode compartment. Over time, the pH and the ionic strength of the pore solution will decrease and increase, respectively.

Regardless of any such adjustment, cation collection can comprise two electrode compartments preferably placed in contact with the soil. The anode component/compartment can be the same as described above. An acid solution, preferably but not limited to HCl, is placed in a different (with reference to a preceding adjustment step) cathode component/compartment, and a cation permeable component separates this compartment from the soil. A direct potential is applied between the anode and the cathode causing positive or hydrogen ions to move into the soil from the anode compartment and cations in the soil to move into the cathode compartment. Over time, the concentration of cations from the soil will increase in the cathode compartment. A solution from the cathode compartment can then be extracted and analyzed for cationic contaminants using standard analytical techniques.

In part, the present invention also includes a method of using ionic movement for discrete collection of an anionic contaminant. Such a method comprises: (1) providing a cathode contacting an aqueous anion source, such a cathode electrically-connected to an anode contacting an aqueous electrolyte; (2) applying a voltage potential between the anode and cathode sufficient to reduce cathodic water, oxidize anodic water and move the cathodic anion into an adjacent medium; and (3) collecting an anionic contaminant moved from the medium toward the anode. In conjunction therewith, the aqueous electrolyte contacting the anode has an oxidation potential lower than water. Each of the electrodes is proximate an anion permeable component and in conductive contact with an anionic contaminated medium.

In various embodiments, the anodic electrolyte comprises a protic acid. Likewise, the cathodic aqueous anion source can be a hydroxy base such that the cathodic anion is hydroxide ion. Regardless, such an anodic electrolyte can comprise nitric acid. As described above, such an acid has an aqueous concentration such that Donnan potential of an anion permeable component is substantially unaffected thereby. While concentrations of an electrolyte such as nitric acid can range from about 0.5N to about 1.5N, concentrations useful with various embodiments of this invention can range from about 0.1N to about 0.2N.

Alternatively, as discussed in the context of cation collection, such a method for collection of anionic contaminants can include media adjustment of pH and/or ionic conductivity. Such an adjustment comprises: (1) providing a cathode contacting an aqueous hydroxide ion source, with the cathode proximate an anion permeable component, and an anode contacting an electrolyte comprising an oxidizable anion and a non-hydrogen cation, with the anode proximate a cation permeable component; and (2) applying a voltage potential between the electrode sufficient to introduce cathodic hydroxide ion and anodic cation into the adjacent medium.

Such an adjustment is optional and, in a soil context, can be performed if high soil pH conditions are preferred or the ionic strength of the soil solution is too low to maintain an effective ionic current. As part of such a first step, two electrode components or compartments are placed in contact with the soil. An alkaline solution, such as but not limited to KOH, is placed in the anode component/compartment, and a cation exchange membrane separates this component/compartment from the soil. An alkaline solution, such as but not limited to KOH, is placed in the cathode component/compartment, and an anion permeable component separates this component/compartment from the soil. A direct potential is applied between the anode and the cathode causing positive or potassium ions to move into the soil from the anode compartment and negative or hydroxide ions to move into the soil from the cathode compartment. Over time, the pH and the ionic strength of the pore solution will increase.

Regardless of any such adjustment, anion collection can comprise two electrode compartments preferably placed in contact with the soil. The cathode component/compartment can be the same as described above. An acid solution, preferably but not limited to $HNO_3$, is placed in a different (with reference to a preceding adjustment step) anode component/compartment, and an anion permeable component separates this component/compartment from the soil. A direct potential is applied between the anode and the cathode causing negative or hydroxide ions to move into the soil from the cathode compartment and anions in the soil to move into the anode compartment. Over time, the concentration of anions from the soil will increase in the anode compartment. A solution from the anode compartment can then be extracted and analyzed for anionic contaminants using standard analytical techniques.

The present invention can be considered, as above, with reference to one or more acids or bases and the corresponding acid or alkaline solutions, together with their respective conjugate bases or acids. Various acid and base systems shown and illustrated herein can be preferred under one or more particular use situations, as they are relatively inexpensive, readily available and the primary reactions at the respective electrodes are predictable and generally non-hazardous. Even so, various other strong acid and base solutions, together with their corresponding attendant and/or displacing cationic or anionic components can be used in conjunction with the present methodology and apparatus with comparable effect, as would be understood by those skilled in the art made aware of this invention. Reference is made to numerous figures, illustrating these and other comprehensive aspects of the present invention.

In a broader context, the present invention also includes a method of using redox potential for discrete collection of an ionic contaminant. Such a method comprises (1) providing a first electrode contacting an electrolyte having either a reduction potential greater than water or an oxidation potential less than water, a second electrode electrically-connected to the first electrode, with each electrode proximate an ion permeable component and in conductive contact with a medium comprising an ionic contaminant; (2) applying a voltage potential between the electrode sufficient to collect the ionic contaminant at one of the electrodes. For collection of a cation contaminant, the first electrode is a cathode and the associated electrolyte has a reduction potential greater than water. In certain embodiments, the cathodic electrolyte comprises a protic acid, such as but not limited to hydrochloric acid. A permeable component associated with such a cathode permits movement of cationic contaminants from the medium, for discrete collection at the cathode, substantially without a medium solvent component moving therewith.

Alternatively, for collection of anionic contaminants, the first electrode is an anode and the anodic electrolyte has an oxidation potential less than water. In certain embodiments, such an electrolyte comprises a protic acid, an example of which can be but is not limited to nitric acid. Such an anode is associated with a permeable component for discrete collection of an anionic contaminant at the anode, substantially without movement of a medium solvent component.

In part, the present invention also includes an apparatus or device for in-situ collection of ionic contaminants from a subject medium. Such an apparatus comprises an anode compartment comprising an anode and an ion permeable component thereabout, a cathode compartment comprising of a cathode therein and an ion permeable component thereabout, the compartments substantially vertically aligned one with the other, with the electrodes electrically connected and each electrode contacting an electrolyte. Once such apparatus can be arranged and configured for a collection of cationic contaminants in or with the cathode compartment. Accordingly, each of the ion permeable components comprises a cation exchange membrane. In association therewith, the anodic electrolyte comprises an aqueous cationic source and the cationic electrolyte has a reduction potential greater than water.

An apparatus for cation collection can further comprise a second cathode compartment with a cathode therein and an anion exchange membrane thereabout. The second cathode compartment is substantially vertically aligned with the aforementioned anode compartment, and a second cathode contacts an electrolyte and is electrically-connected to the aforementioned anode. As can relate to the present methodologies, such a second cathode compartment can be employed to lower media pH conditions and/or increase ionic strength for improved cationic collection. Accordingly, the second cathode electrolyte comprises an acid and a non-hydroxide conjugate base.

Conversely, an apparatus/device of this invention can be arranged and configured for collection of an anionic contaminant in or with the anode compartment. Accordingly, each of the ion permeable components can comprise an anion exchange membrane. In conjunction therewith, the cathodic electrolyte comprises an aqueous anion source and the anodic electrolyte has an oxidation potential lower than water. Where adjustment of the contaminated medium is desired, the apparatus can further comprise a second anode compartment with an anode therein and a cation exchange membrane thereabout. As discussed elsewhere herein, the second anode compartment is substantially vertically aligned with the aforementioned cathode compartment. The second anode contacts an electrolyte and is also electrically-connected to the cathode. Accordingly, to raise both pH and ionic conductivity, the second anode electrolyte comprises a base and a non-hydrogen conjugate acid.

An apparatus of this invention is believed novel as it can uniquely exploit the combined advantages of direct-push-type probes, ion exchange membranes, and/or electrokinetic phenomena. Preferred embodiments include two probe configurations, one to collect cationic contaminants in soils and the other to collect anionic contaminants. While useful in various media, the configuration to collect cationic contaminants is especially effective in all soils, but somewhat less so in low permeable soils possessing significant anion exchange capacity. Likewise, the configuration to collect anionic contaminants is effective in all soils, but somewhat less so in low permeable soils possessing significant cation exchange capacity. Reduced effectiveness in low permeable soils can be attributed to accelerated water splitting at the bipolar interfaces between the soils and the ion exchange membranes.

As referenced elsewhere herein, the apparatus and methods of this invention can be utilized for ionic collection ranging from contaminant sampling to removal/remediation. The extent of collection can depend, in part on applied voltage potential and/or duration with respect to a particular medium. In the context of contaminant removal/remediation, a potential difference of about 1 to about 9 V/cm (electrode distance) can be applied over a desired time duration. Conversely, for purposes of sampling, potentials up to and exceeding an order of magnitude higher can be employed for shorter durations, the extent of which may be limited only by the heat tolerance of any associated permeable component or membrane. Typically, sampling collections can be achieved satisfactorily with applied potentials up to about 20 V/cm.

BRIEF DESCRIPTION OF THE DRAWINGS

It is important to note that the attached figures illustrate one or more embodiments or aspects of this invention and are not to be considered limiting of its scope, as the invention may admit to various other equally or comparably effective embodiments.

DETAILED DESCRIPTION OF SEVERAL COLLECTION METHODS, AND APPARATUS EMBODIMENTS

Cation Collection

As discussed above, cation collection can involve one or more steps. One optional, initial step involves sufficiently decreasing the pH of a soil medium, and a subsequent step preferably involves collecting cations from the soil with the assistance of hydrogen ions that migrate across the soil. If the concentration of mobile cations in the soil is sufficient or high enough to sustain an effective ionic current or if low pH conditions are not necessary, such an initial step may be optional; otherwise, both steps are performed. Mobile cations are those that will move in the presence of an applied field. For example, mobile cations in saturated soils can originate from (a) free cations in the pore solution and (b) cations associated with the cation exchange sites of the soil. An effective ionic current is arbitrarily greater than about 0.05 A. Preliminary experiments indicate an ionic current lower than 0.05 A to be adequate, but somewhat less effective in collecting a significant quantity of cations in a realistic time span.

The use or presence of hydrogen ions in a contaminated medium, such as soil, provides benefits for cation collection: hydrogen ion (a) exchanges with other sorbed cations, (b) dissociates complexes in solution, (c) dissolves precipitates, (d) ionizes weak bases, and (e) may lower the pH of the soil solution below the point of zero charge (pzc) and reverse the polarity of negative variable charges on colloids, thus releasing sorbed cations. With respect to cation exchange membranes (CEMs), other cations can be used, but hydrogen ion as a displacing cation is preferred over higher valence cations or cations higher on the lypotropic series and based at least in part on the selectivity of the CEMs: The selectivity of $H^+$ in CEMs is low compared to other cations useful with this invention. Hydrogen ions readily and rapidly migrate across the CEM and allow other cations with higher selectivities to occupy fixed charged functional sites in the CEM.

Decreasing the pH of the Soil

Figure 1:
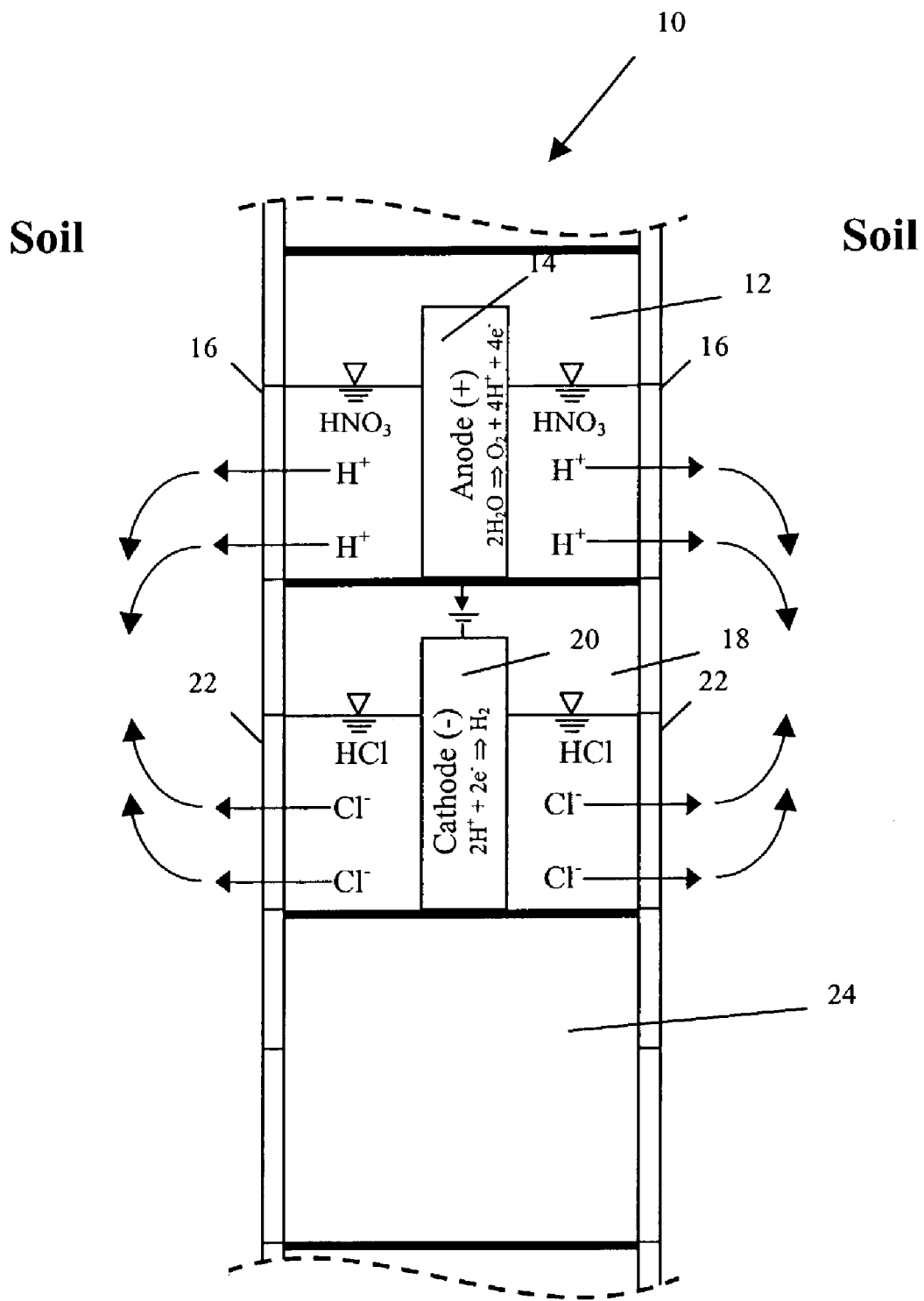
FIG. 1 is a schematic representation illustrating a method of this invention and a component apparatus useful in conjunction therewith, to decrease the pH of a medium, an optional step when collecting cations.

A method, apparatus and/or component configuration useful in conjunction with the decrease in pH of the soil solution while simultaneously increasing the concentration of mobile ions in soil is illustrated in FIG. 1. Such an apparatus 10 or associated method provides two isolated compartments: anode compartment 12 and cathode compartment 18. An acid solution, preferably $HNO_3$, is placed in the anode compartment, and a CEM 16 separates this compartment from the soil. Since neither nitrate nor hydrogen ions will be readily oxidized at the anode 14, the primary oxidation reaction at the anode is the oxidation of water ($2H_2O \Rightarrow O_2+4H^++4e^-$; Eo=−1.299 V). An acid solution, preferably HCl, is placed in the cathode compartment 18, and an anion exchange membrane (AEM) 22 separates this compartment from the soil. Since chloride ions will not be readily reduced at the cathode 20, the primary reduction reaction at the cathode is the reduction of hydrogen ions, as the reduction potential of this reaction ($2H^++2e^- \Rightarrow H_2$; Eo=0.000 V) is considerably higher than the reduction potential of water ($2H_2O+2e^- \Rightarrow H_2+2OH^-$; Eo=−0.828). HCl is preferred over a strong salt solution, such as KCl, since the preferred reduction reaction at the cathode would most likely be the reduction of water. In the latter instance, the resulting hydroxide ions from the reduction of water may migrate into the soil, counter to the desired reduction of soil pH.

Under the influence of a direct voltage potential, water is oxidized at the anode 14, forming hydrogen ions and oxygen gas. Hydrogen ions migrate through the CEM 16 and into the soil. Hydrogen ions migrate out of the anode compartment 12 at the same rate that they are produced at the anode (i.e., electroneutrality is maintained in the anode compartment). At the cathode 20, hydrogen ions are reduced to hydrogen gas. Chloride ions migrate out of the cathode compartment 18 at the same rate that hydrogen ions are reduced at the cathode (i.e., electroneutrality is maintained in the cathode compartment). Likewise, the rate of hydrogen ion production at the anode 14 equals the rate that hydrogen ions are reduced at the cathode 20 (i.e., the electric current is accounted for). Over time, the pH of the soil solution will sufficiently decrease and the concentration of mobile ions in the soil will sufficiently increase as hydrogen cations and chloride anions migrate into the soil.

Collecting Cations with Hydrogen Ions that Migrate across the Soil

Figure 2:
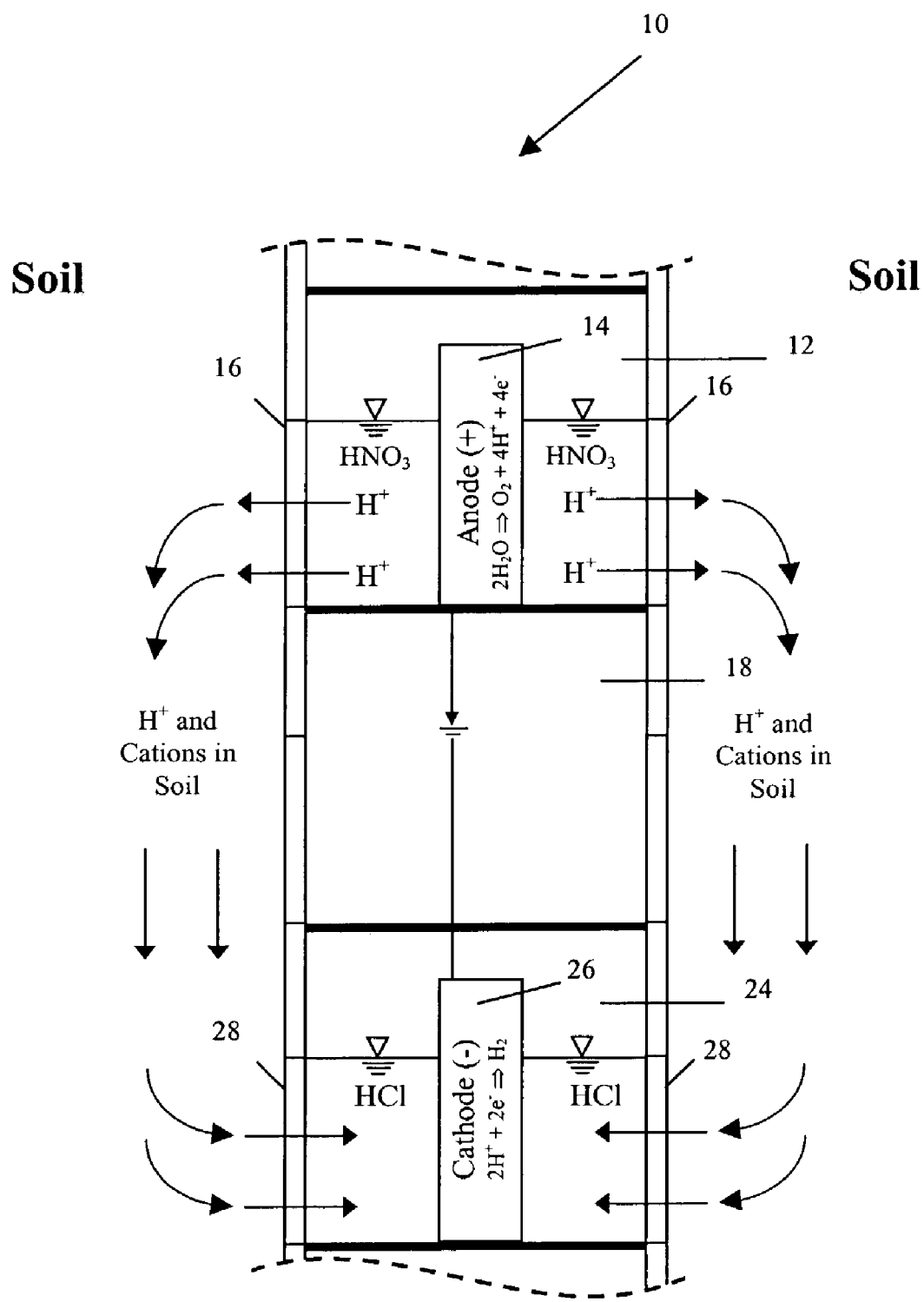
FIG. 2 is a schematic representation of a method used to collect cations.

A method, apparatus and/or component configuration useful in the collection of cations from soil is illustrated in FIG. 2. The anode compartment 12 of apparatus 10 can be as described, above, in conjunction with a medium adjustment step. An acid solution, preferably HCl, is placed in a different, second cathode compartment 24, and a CEM 28 separates this compartment from the soil. Under the influence of a direct voltage potential, water is oxidized at the anode 14, forming hydrogen ions and oxygen gas. Hydrogen ions migrate through the CEM 16 nearest the anode 14 and across the soil. At the cathode 26, hydrogen ions are reduced to hydrogen gas. Soil cations migrate through the CEM 28 nearest the cathode 26 at the same equivalent rate that hydrogen ions are reduced at the cathode. Electroneutrality cannot be maintained in the cathode compartment 24 by losing chloride ions since the CEM 28 near the cathode 26 prevents the migration of anions. Likewise, the rate of hydrogen ion production at the anode 14 equals the rate that hydrogen ions are reduced at the cathode 26 (i.e., the electric current is accounted for). Over time, hydrogen ions are the primary cations entering the cathode compartment 24 after the majority of initial soil cations migrate into the cathode compartment. The solution from the cathode compartment 24 can then be extracted and analyzed for cationic contaminants using standard analytical techniques.

Figure 6:
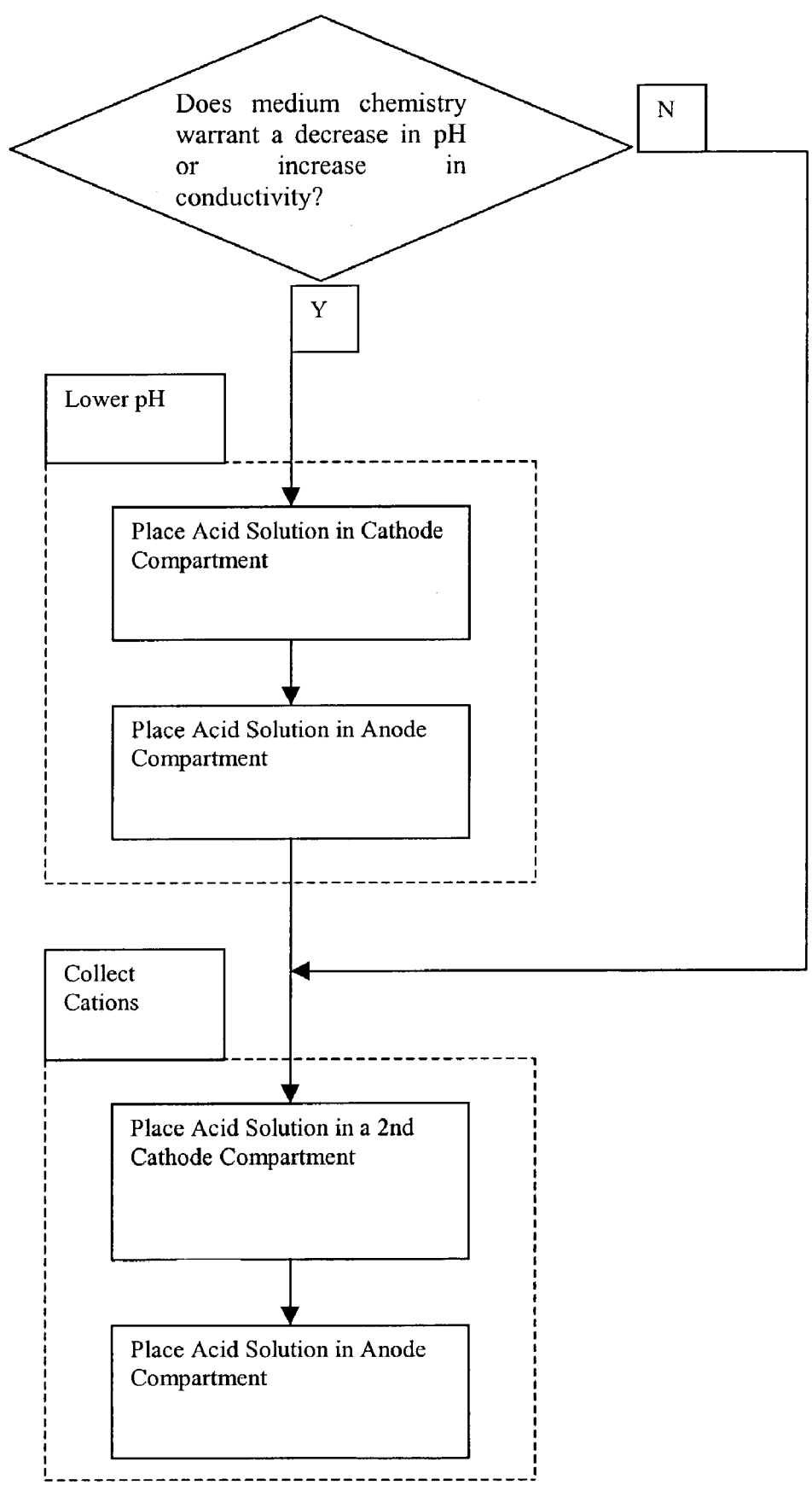
FIGS. 6 and 7 provide schematic flow charts illustrating various methods of this invention, in accordance with the broader aspects thereof, without reference to any particular apparatus or component useful therewith.
Figure 8:
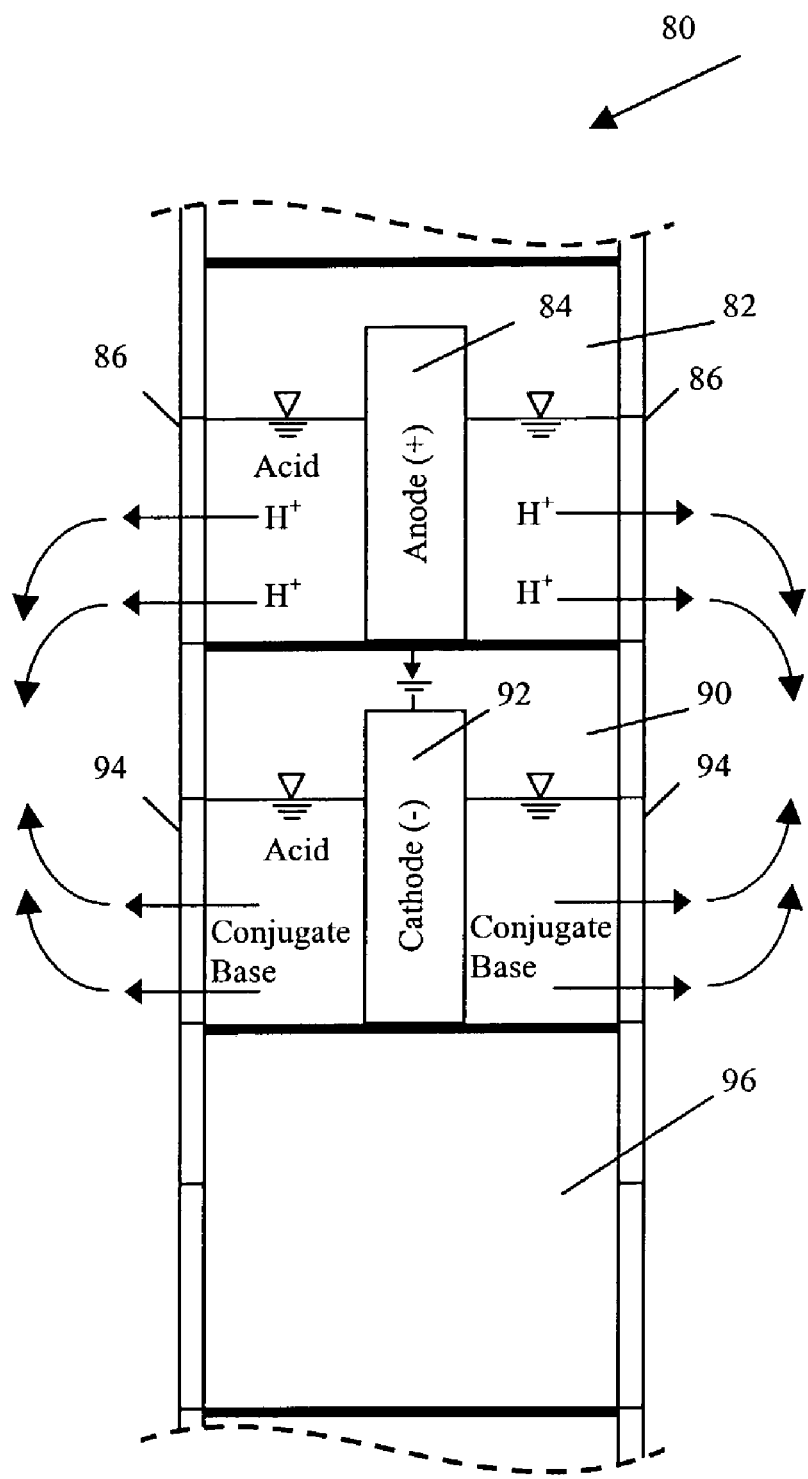
FIGS. 8-11 provide additional schematic illustrations of additional embodiments of the present invention.
Figure 9:
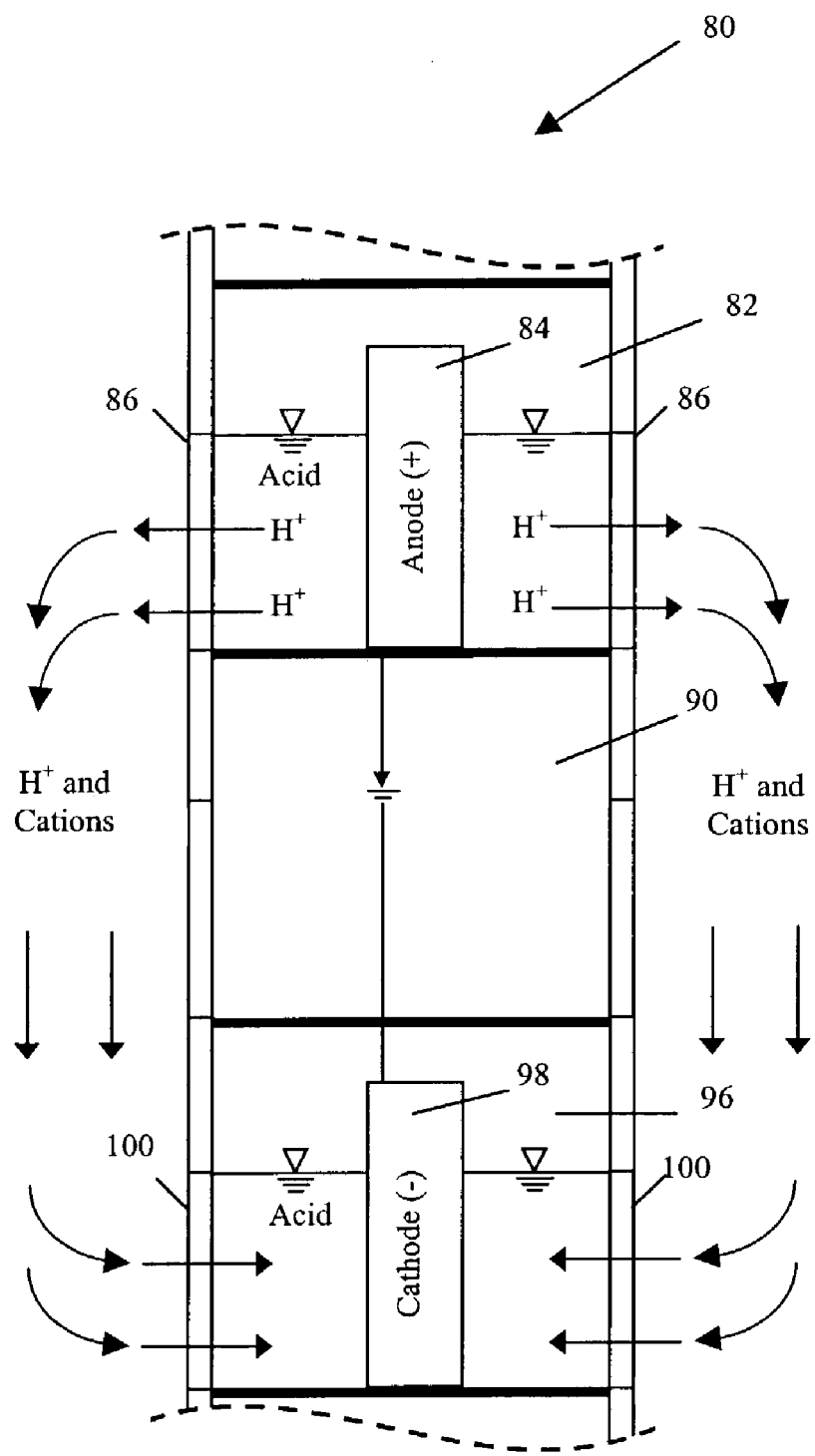

More generally, the methodologies of this invention can be applied to other cation contaminated media. Reference is made to FIGS. 6 and 8-9 for cationic sampling, collection and/or remediation. Regardless of media identity, a decrease in pH and/or increase in ionic conductivity may be desired. Referring more particularly to FIG. 8, apparatus 80, anode compartment 82 and cathode compartment 90, an acid solution is placed in the anode compartment with a CEM 86 separating it from the contaminated medium. Likewise, an acid is placed in the cathode compartment 90, and an AEM 94 is positioned between cathode 92 and the contaminated medium. Under the influence of a direct voltage potential, water is oxidized at the anode 84. Hydrogen ions migrate through the CEM 86 into the medium out of the anode compartment 82 at or about the same rate such ions are produced at the anode. Concurrently, at the cathode 92, hydrogen ions are reduced to hydrogen gas. The conjugate base ions migrate out of the cathode compartment 90 at or about the same rate that hydrogen ions are reduced at the cathode. Over time, the pH of the medium decreases, with a concurrent increase in ionic conductivity as hydrogen ions and conjugate base anions migrate into the medium.

With further reference to FIGS. 6 and 9, cationic contaminants can be collected utilizing an apparatus 80. An acid solution is placed in a second cathode compartment 96, separate and different from the cathode compartment utilized for the preceding adjustment. Under the influence of a direct voltage potential, water is oxidized at the anode 84, forming hydrogen ions and oxygen gas. The ions migrate through the CEM 86 into the adjacent medium. At the cathode 98, hydrogen ions are reduced to hydrogen gas. Cationic contaminants migrate through CEM 100 nearest the cathode 98 at the same or an equivalent rate that hydrogen ions are reduced at the cathode, inasmuch as CEM 100 prohibits electroneutrality and anionic migration into the medium. After a suitable collection period, a solution from the cathode compartment 96 can be extracted and analyzed for cationic contaminants.

Anion Collection Method

As discussed above, anion collection can involve one or more steps. One optional, initial step involves sufficiently increasing the pH of a soil medium, and a subsequent step preferably involves collecting anions from the soil with the assistance of hydroxide ions that migrate across the soil. If the concentration of mobile anions in the soil is sufficient or high enough to sustain an effective ionic current or if high pH conditions are not necessary, such an initial step may be optional; otherwise both steps are performed. Mobile anions are those that will move in the presence of an applied field. For example, mobile anions in saturated soils can originate from (a) free anions in the pore solution and (b) anions associated with the anion exchange sites of the soil. An effective ionic current is arbitrarily greater than about 0.05 A. Preliminary experiments indicated an ionic current lower than 0.05 A to be adequate, but somewhat less effective in collecting a significant quantity of anions in a realistic time span.

The use or presence of hydroxide ions in a contaminated medium, such as soil, provides benefits for anion collection: hydroxide ion (a) exchanges with other sorbed anions, (b) ionizes weak acids, (c) encourages the formation of complexes and precipitates with hydroxide and not other anionic ligands, and (d) may raise the pH of the soil solution above the point of zero charge (pzc) and may reverse the polarity of positive variable charges on colloids, thus releasing sorbed anions. With respect to anion exchange membranes (AEMs), other anions can be used, but hydroxide as a displacing anion is preferred over higher valence anions or anions higher on the lypotropic series and based mainly on the selectivity of the AEMs: The selectivity of hydroxide in AEMs is low compared to other anions useful with this invention. Hydroxide ions should readily and rapidly transport across the AEM and allow other anions with higher selectivities to occupy fixed charged functional sites in the AEM.

Increasing the pH of the Soil

Figure 3:
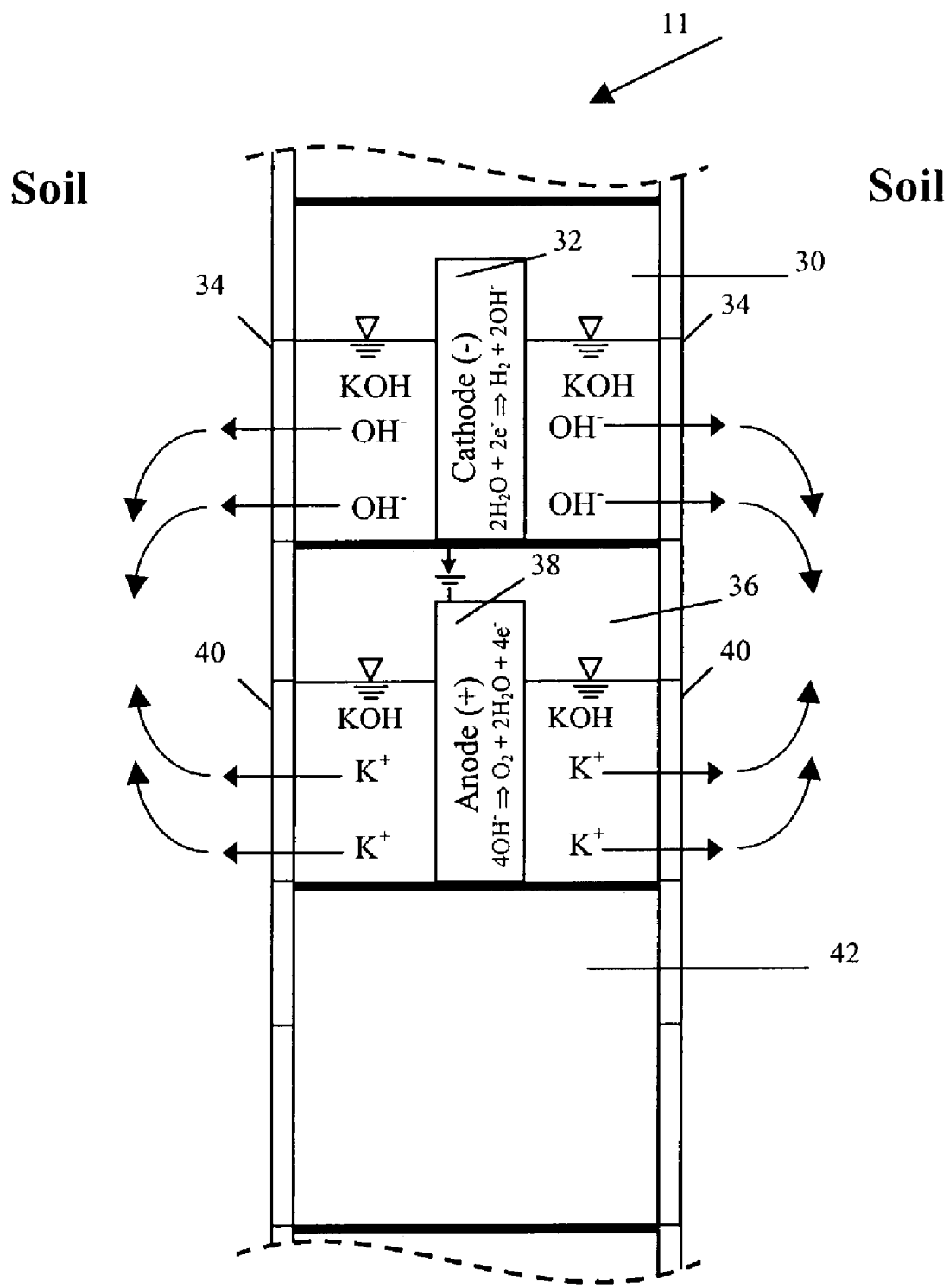
FIG. 3 is a schematic representation of a method used to increase the pH of a medium, an optional step when collecting anions.

A method, apparatus and/or component configuration useful in conjunction with the increase in pH of the soil solution while simultaneously increasing the concentration of mobile ions in the soil is illustrated in FIG. 3. Such an apparatus 11 or associated method provides two isolated compartments: anode compartment 36 and cathode compartment 30. An alkaline solution, such as KOH, is placed in the cathode compartment, and an AEM 34 separates this compartment from the soil. Since hydroxide ions will not be readily reduced at the cathode 32, the primary reduction reaction at the cathode is the reduction of water, as the reduction potential of water ($2H_2O+2e^- \Rightarrow H_2+2OH^-$; Eo=−0.828 V) is much higher than the reduction potential of potassium ions ($K^++e^- \Rightarrow$; Eo=−2.931 V). An alkaline solution, such as KOH, is placed in the anode compartment 36, and a cation exchange membrane (CEM) 40 separates this compartment from the soil. Since potassium ions will not be readily oxidized at the anode 38, the primary oxidation reaction at the anode is the oxidation of hydroxide ions, as the oxidation potential of this reaction ($4 OH^- \Rightarrow O_2+2H_2O+4e^-$; Eo=−0.401 V) is considerably higher than the oxidation potential of water ($2H_2O \Rightarrow O_2+4H^++4e^-$; Eo=−1.299 V). KOH is preferred over a strong salt solution, such as KCl, for the following reasons. First, salt anions may oxidize at the anode and form toxic gases (i.e., $Cl_2$). Second, if a strong salt solution were used, the preferred reaction at the cathode would most likely be the oxidation of water, with transport of the resulting hydrogen ions into the soil, counter to the desired increase of soil pH.

Under the influence of a direct voltage potential, water is reduced at the cathode 32 forming hydroxide ions and hydrogen gas. Hydroxide ions migrate through the AEM 34 and into the soil. Hydroxide ions migrate out of the cathode compartment 30 at the same rate that they are produced at the cathode 32 (i.e., electroneutrality is maintained in the cathode compartment). At the anode 38, hydroxide ions are oxidized into oxygen gas and water. Potassium ions migrate out of the anode compartment 36 at the same rate that hydroxide ions are oxidized at the anode (i.e., electroneutrality is maintained in the anode compartment). Likewise, the rate of hydroxide ion production at the cathode 32 approximates or equals the rate that hydroxide ions are oxidized at the anode 38 (i.e., the electric current is accounted for). Over time, the pH and the ionic strength of the soil solution will sufficiently increase as potassium cations and hydroxide anions migrate into the soil.

Collecting Anions with Hydroxide Ions that Migrate Across the Soil

Figure 4:
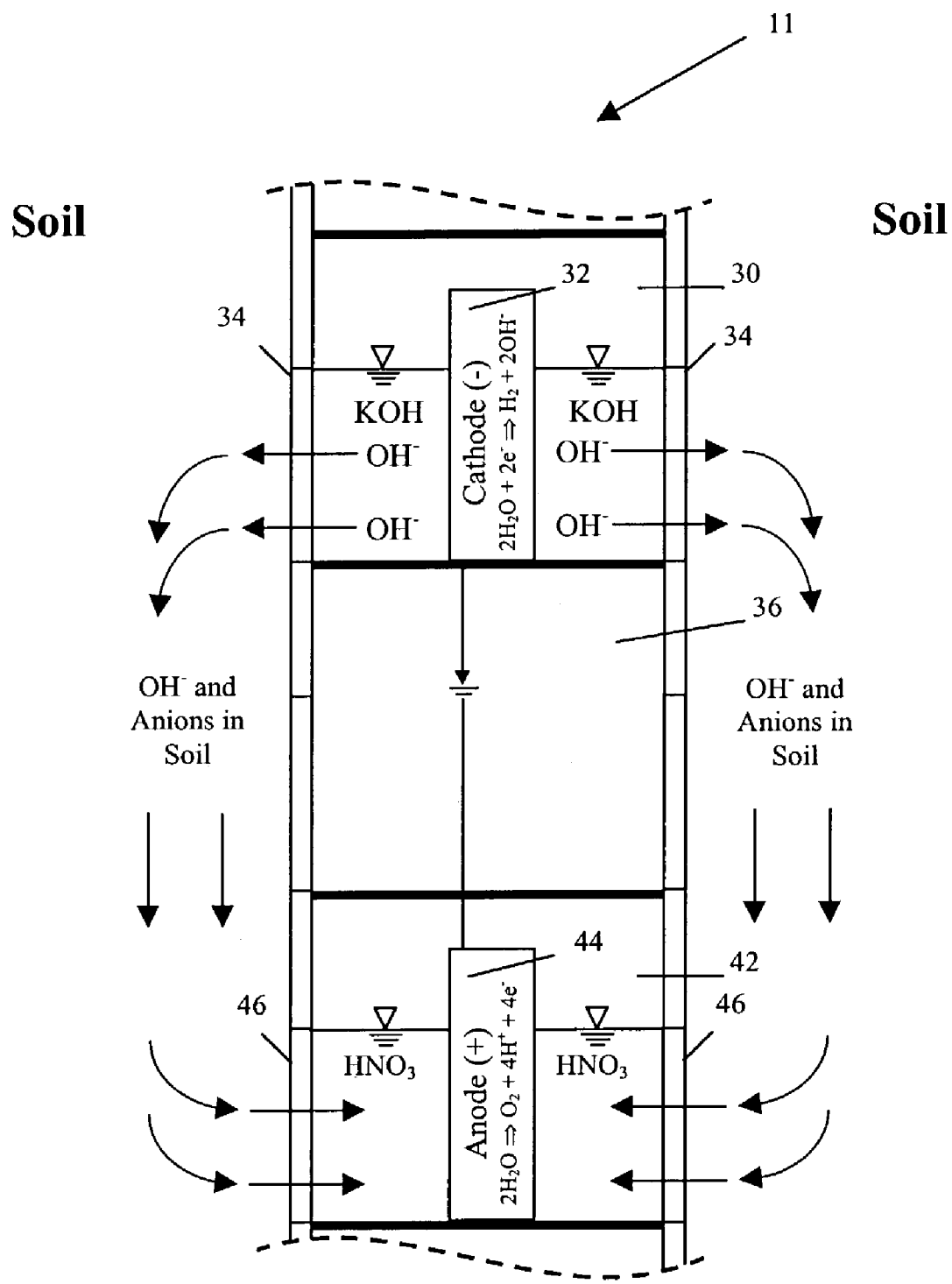
FIG. 4 is a schematic representation of a method used to sample anions.

A method, apparatus and/or component configuration useful in the collection of anions from the soil is illustrated in FIG. 4. The cathode compartment 30 of apparatus 11 can be as described, above, in conjunction with a medium adjustment step. An acid solution, preferably $HNO_3$, is placed in a different, second anode compartment 42, and an AEM 46 separates this compartment from the soil. Since neither nitrate nor hydrogen ions will be readily oxidized at the anode 44, the primary oxidation reaction at the anode is the oxidation of water ($2H_2O \Rightarrow O_2+4H^++4e^-$; Eo=−1.299 V). $HNO_3$ was selected over a base, such as KOH, since this reaction is less damaging to a preferred ceramic Ebonex™ anode 44. The oxidation of hydroxide ions into water and oxygen gas creates significantly more heat than the oxidation of water at the anode. For short time periods, such as with an initial adjustment step, should be of no concern. However, for long time periods, such as with a collection or remediation step discussed herein, a ceramic anode may thermally degrade.

Under the influence of a direct voltage potential, water is reduced at the cathode 32 forming hydroxide ions and hydrogen gas. Hydroxide ions migrate through the AEM 34 nearest the cathode and migrate across the soil. Water is oxidized anode 44 forming hydrogen ions and oxygen gas. Soil anions migrate through the AEM 46 nearest the anode at the same equivalent rate that hydrogen ions are produced at the anode. Electroneutrality cannot be maintained in the anode compartment 42 by losing hydrogen ions since the AEM 46 near the anode prevents the migration of cations. Likewise, the production rate of hydroxide ions at the cathode 32 approximates or equals the production rate of hydrogen ions at the anode 44 (i.e., the electric current is accounted). Over time, hydroxide ions are the primary anions entering the anode compartment 42 after the majority of initial soil anions migrate into the anode compartment. The solution from the anode compartment can then be extracted and analyzed for anionic contaminants using standard analytical techniques.

Figure 7:
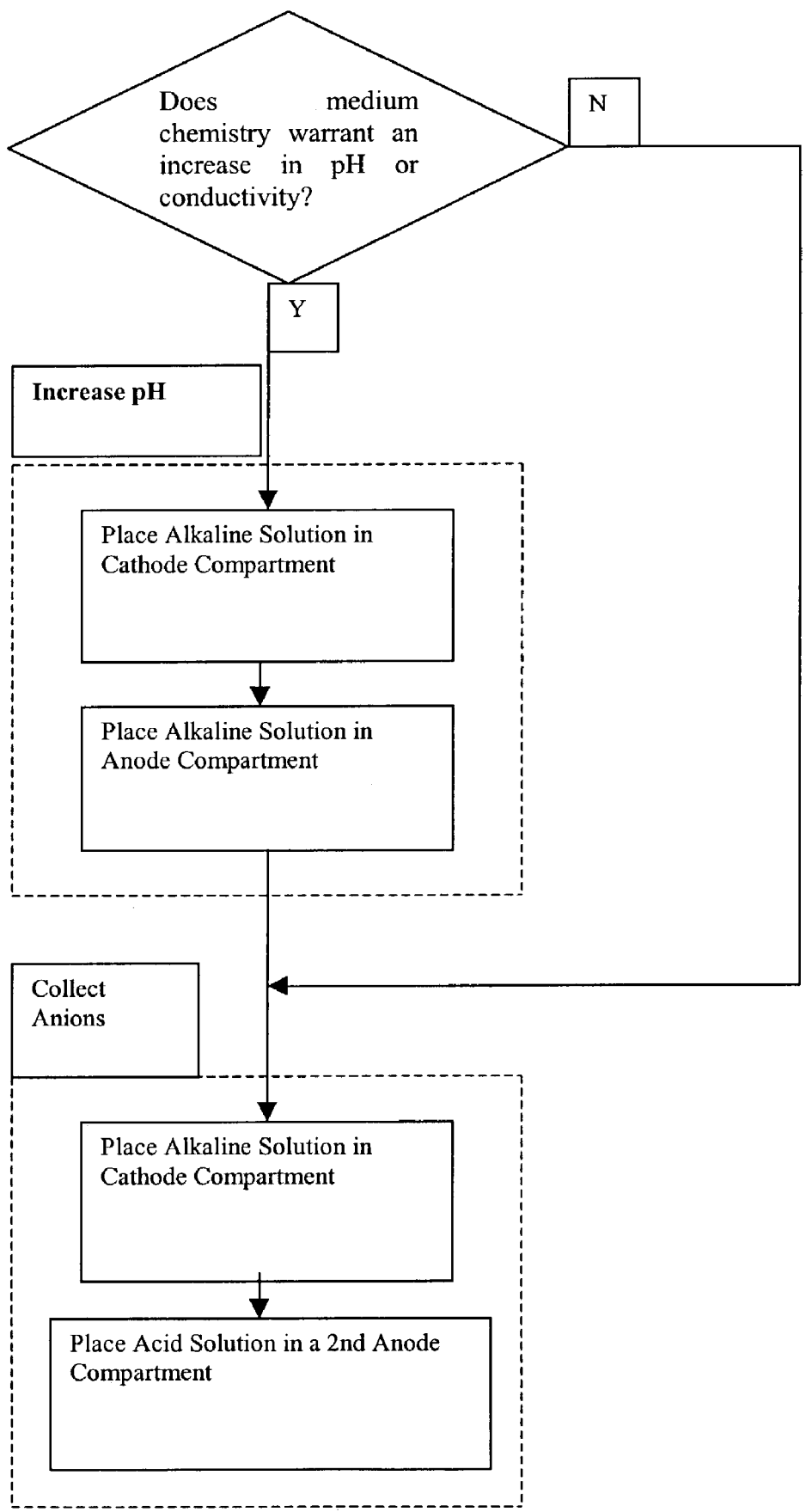
Figure 10:
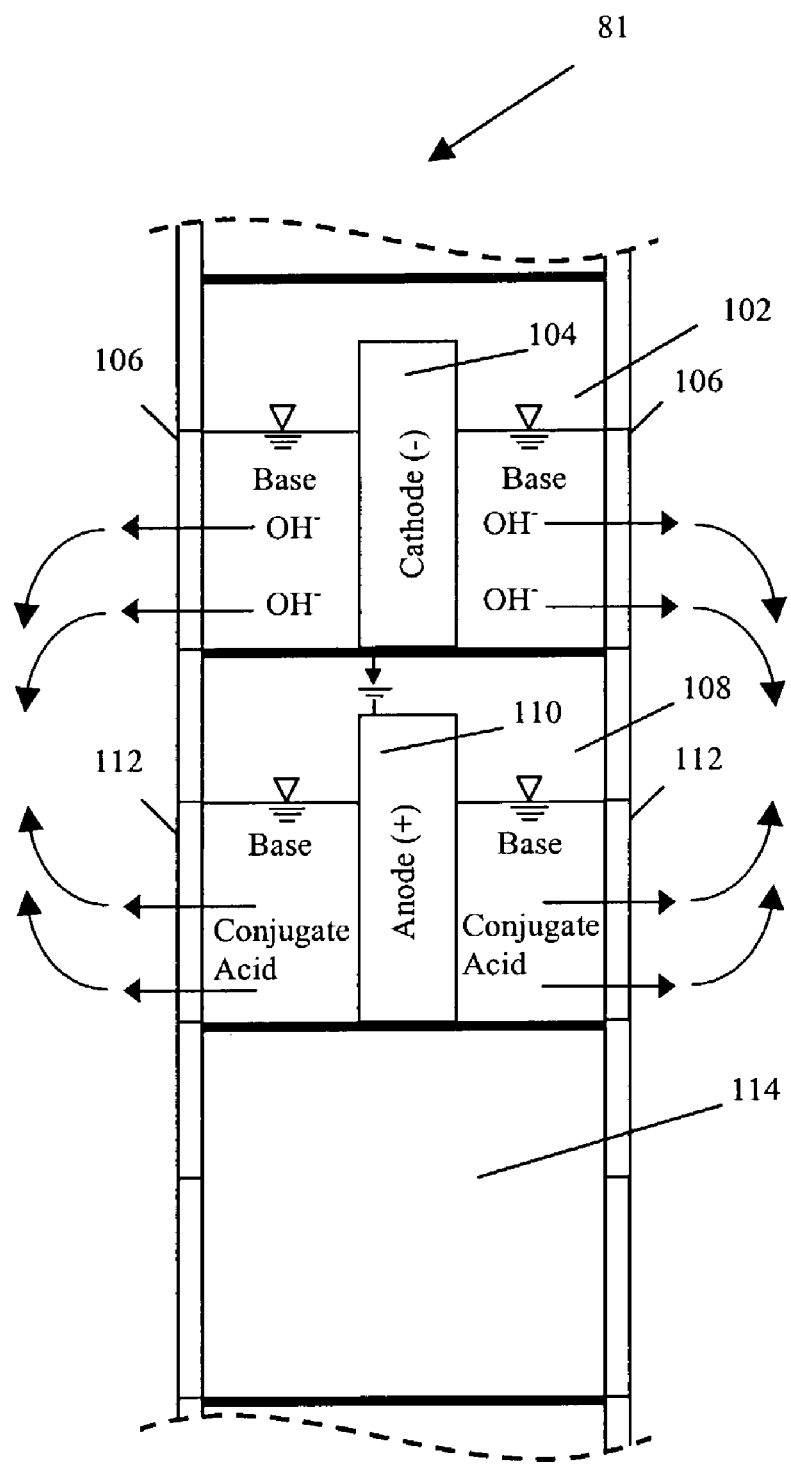
Figure 11:
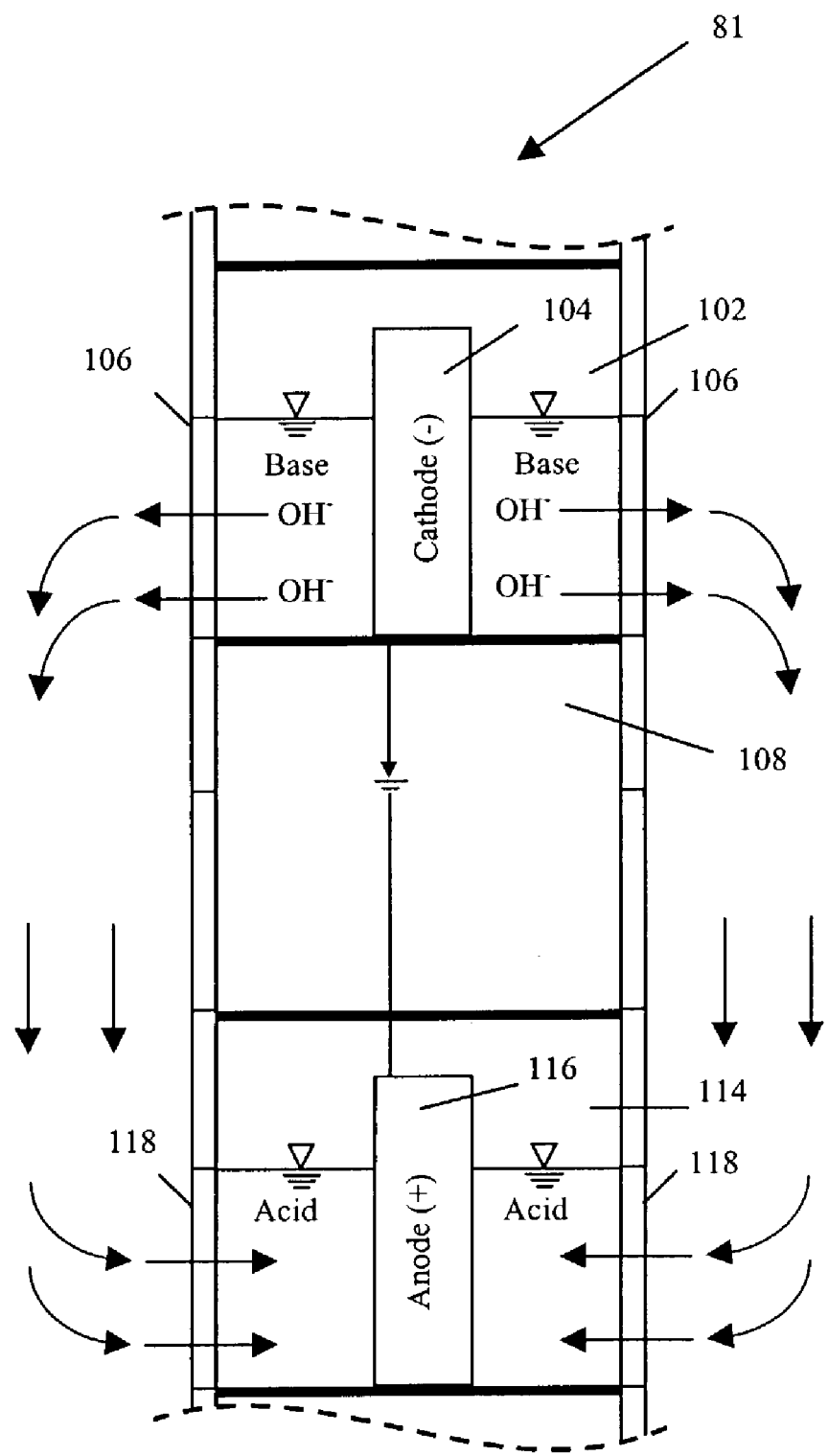

More generally, the methodologies of this invention can be applied to other anion contaminated media. Reference is made to FIGS. 7 and 10-11 for anionic sampling, collection and/or remediation. Regardless of medium identity, an increase in pH and/or ionic conductivity may be desired. With particular reference to FIG. 10 and apparatus 81, anode compartment 102 and cathode compartment 108, an alkaline solution can be placed in the cathode compartment 108 with an AEM 112 separating it from the adjacent medium. An alkaline solution can also be placed in the anode compartment 102, with a CEM 106 separating it from the medium. Under the influence of a direct voltage potential, water is reduced at a cathode 104, forming hydroxide ions and hydrogen gas. Hydroxide ions migrate out of the cathode compartment 102 at or about the same rate they are produced at the cathode 104. At the anode 110, hydroxide ions are oxidized into oxygen gas and water. The conjugate acid/cations migrate out of the anode compartment 108 at or about the same rate that hydroxide ions are oxidized at the anode 110. Over sufficient time, the pH and ionic conductivity of the adjacent medium increase as the conjugate acid and hydroxide ions migrate thereto.

Referring to FIG. 7 in conjuction with FIG. 11, an apparatus 81 can be utilized to collect anionic contaminants. The cathode compartment 102 can be as described, above, in conjuction with a pH/conductivity adjustment procedure. An acid solution, can be placed in anode compartment 114, separate and different from the anode compartment utilized in the previous adjustment. Under the influence of a direct voltage potential, water is reduced at the cathode 104, forming hydroxide ions and hydrogen gas. Hydroxide ions migrate through the AEM 106 nearest the cathode and into the adjacent medium. Water is oxidized at the anode 116, forming hydrogen ions and oxygen gas. Anionic contaminants migrate from the medium through AEM 118 proximate to the anode 116 at or about the same rate that hydrogen ions are produced at the anode, inasmuch as the AEM 118 precludes electroneutrality by cation migration into the medium. After sufficient time, the solution from the anode compartment can be extracted and analyzed for anionic contaminants collected therein.

Preferred Apparatus Embodiment and Sampling Procedure

Figure 5:
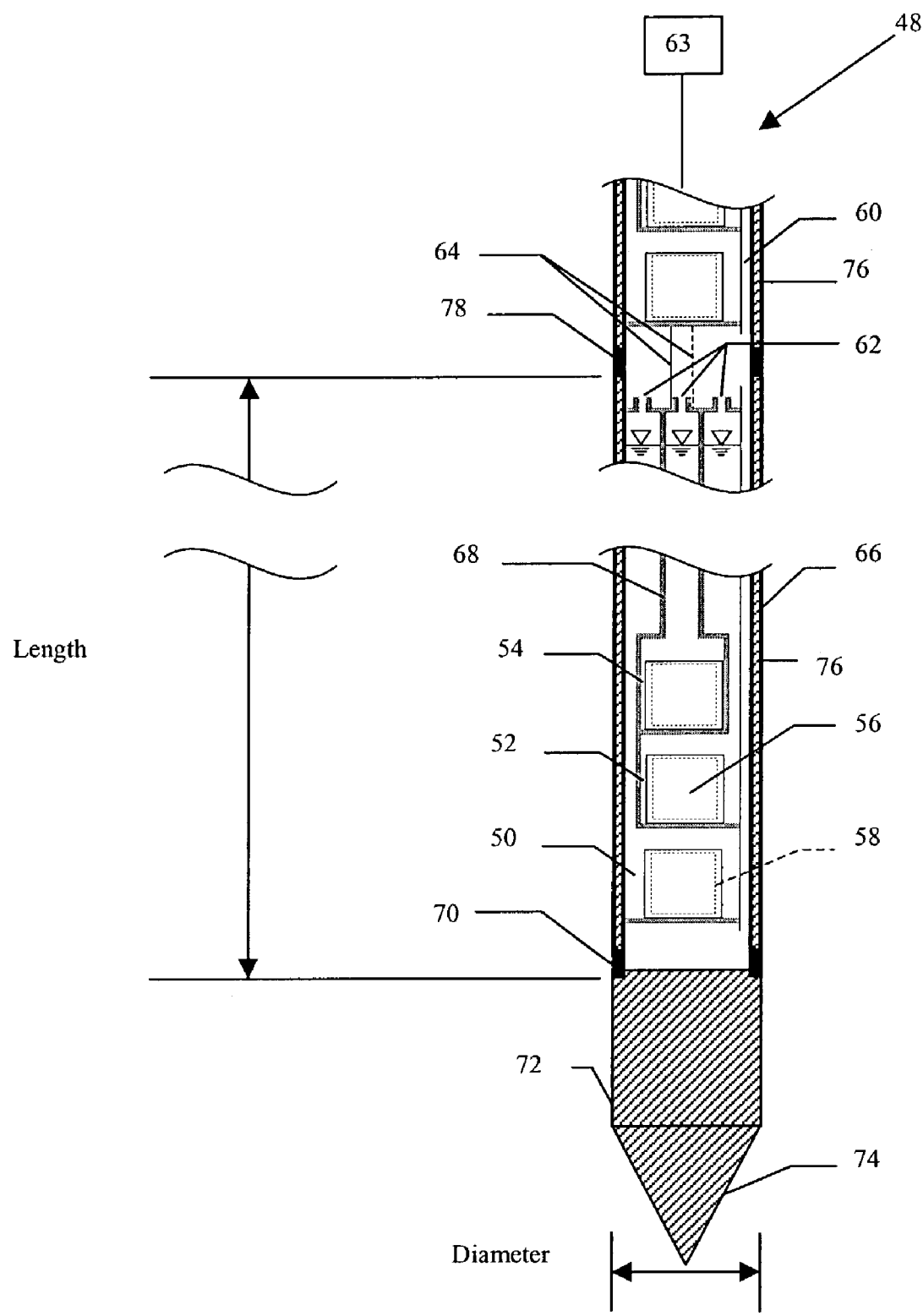
FIG. 5 is a schematic partial cross-sectional view of an apparatus, in accordance with this invention.

Without limitation to any one component/compartment configuration, the methods of this invention can be effected using an apparatus such as that shown in FIG. 5, a direct-push probe structurally and/or functionally modified in accordance herewith. Direct-push probes involve no drilling or contaminated cuttings, are minimally invasive, are relatively quick to insert into the subsurface, and are less costly than drilling. The following is a conceptual description of a short-term direct-push sampler that could be utilized in the field. Again, it is important to note that what follows is one typical embodiment of this invention and is not to be considered limiting of its scope, since the invention may admit to other equally effective embodiments. Standard diameters of conventional tubular direct-push probes are typically either 3.66 cm (1.44") or 4.45 cm (1.75") and apparatus of this invention can be comparably configured, optionally with multiple sections, and dimensioned to achieve comparable sampling depths: typically at depths of 15 m (50 ft) to 30 m (100 ft) but up to depths exceeding 122 m (400 ft).

FIG. 5 illustrates a cross section of an apparatus 48, in accordance with this invention. In certain embodiments, the dimensions of each section 76 are about 0.91 m to about 1.21 m (3' to 4') in length with a diameter of about 4.45 cm (1.75"). A useful material for the outer tubing 66 is a high strength steel coated with polytetrafluoroethylene (PTFE). The high strength steel is able to withstand the loads required to push and pull apparatus 48 in and out of the ground. A PTFE or similar coating is beneficial because of its low conductivity, high chemical resistance, high inertness, and high corrosion resistance. Electrodes 56 can comprise Ebonex™ conductive ceramic, a relatively inert material. Other components, such as compartments 50-54, can also be made with PTFE. A plurality of individual apparatus sections 76 can be co-joined with watertight and threaded connections 78, to extend apparatus length, increase the number of electrode compartments and enhance collection capacity, as required.

With reference to FIGS. 1-2, 3-4, 8-9 and 10-11, an apparatus of this invention can have integrated therewith a separate electrode/compartment to adjust media pH and/or ionic conductivity, as described above. For example, in FIG. 5, compartments 50-54 can in the context of cationic collection correspond to compartments 12, 18 and 24 in FIGS. 1-2 or in the context of anionic collection to compartments 30, 36 and 42 in FIGS. 3-4. The order, sequence and/or compartment/electrode configuration can vary with apparatus design. Collection can proceed after an optional media adjustment procedure by switching electrical connections from one cathode to another (for cationic collection) or one anode to another (for anionic collection). Multiples of such an arrangement can be incorporated to an apparatus of this invention using a plurality of co-joined sections 76, as illustrated in FIG. 5.

Electrical contact points 64 can be centrally placed at the top and bottom of each section, for electrical connection between power source 63 and each incorporated electrode/compartment. The respective electrical lines are routed along the internal walls 68 and connected to the electrodes. The dashed square areas in FIG. 5 denote the locations of ion exchange membranes 58. The exposed permeable areas adjacent the medium are preferably about 2.54 cm by at least about 2.54 cm (1" by at least 1"), as configured on two opposed sides of the probe apparatus. Ion exchange membranes can be encased in a protective polymeric screening and housing (not shown) which are easily attached to the probe. A recommended volume of each compartment 50-54 is at least 200 ml., a volume sufficient to collect an ample quantity of ions without compromising the Donnan potential of the ion exchange membranes 58. Initial electrolyte concentration (anolyte or catholyte) is about 0.1 M (i.e., 0.1 M $HNO_3$, 0.1 M HCl, or 0.1 M KOH). As mentioned above, such a concentration is highly conductive, will not compromise the Donnan potential of the ion exchange membrane, and will not cause excessive membrane swelling. Openings 62 to each of the compartments are located at the top of each section. Gas generated at the electrodes will move to the surface through the openings and gas venting tubes 60.

Various electrode, membrane and/or compartment components useful in conjunction herewith would be known to those skilled in the art made aware of this invention, such components including those described in U.S. Pat. Nos. 5,489,370 and 5,405,509—each of which is incorporated herein in its entirety.

Commencing with a sampling, collection and/or remediation procedure, anolyte(s), catholyte(s), and ion exchange membranes are added/introduced to one or more sections 76, a plurality of which can be connected at threaded sections 78 (and at 70 to driving head 72, with penetration cone 74). To drive the probe into a soil medium, pushing is usually performed by a van or truck equipped with a hydraulic/pneumatic ram capable of delivering forces as high as 30 to 40 tons. The rate of penetration is typically 2 cm/sec. The entire setup is usually enclosed in a van or truck which allows for sampling during inclement weather. Electrokinetic collection is achieved by applying a direct voltage with a power generator or another suitable source outside the apparatus, typically distal to cone/end 74, although certain embodiments contemplate a source internal to the apparatus. The time period of the collection is based on the estimated volume of the medium, the total equivalents of mobile cations or anions therein, and the magnitude of the ionic current. Collection efficiency will be moderate to high if the total equivalents of mobile cations or anions in the soil are significantly lower than the total delivered charge in moles of electrons. After an allotted time, the entire apparatus assembly can be pulled to the surface. The anolyte(s), catholyte(s), and ion exchange membranes are extracted. Soil is removed from the ion exchange membranes with deionized water, and counterions are displaced from the ion exchange membranes using a strong acid (i.e., 2 M HCl). Alternatively, the collected solutions can be accessed in situ via tubes 62. The concentration of ions in the collected solutions can then be analyzed using standard analytical techniques.

Optimally, there should be tight contact between the ion exchange membranes and the adjacent soil medium. When apparatus 48 is inserted in the ground, a smear zone will develop at the interface of the probe and the soil. This smear zone will fill the voids between the protective screening and the ion exchange membranes. Consideration should also be given to the pore water pressures acting on the ion exchange membrane since the membrane may rupture if the pressure exceeds the burst strength of the ion exchange membrane. In such cases, it is recommended to use reinforced membranes with high burst strengths (i.e., greater than 100 psi).

EXAMPLES OF THE INVENTION

The following non-limiting examples and data illustrate various aspects and features relating to the methods and/or apparatus of the present invention. In comparison with the prior art, the present methods and apparatus provide results and data which are surprising, unexpected and contrary thereto. While the utility of this invention can be illustrated through the use of several displacement ions and/or solutions thereof together with various electrodes, components, compartments and/or apparatus which can be used therewith, it will be understood by those skilled in the art that comparable results—i.e., the collection, sampling, analysis and/or removal of a wide range of media soil contaminants—are obtainable with various other displacement ions/solutions and components, compartments, and apparatus, as are commensurate with the scope of this invention. Collectable contaminants include without limitation those of the prior art, as heretofor mentioned, although some consideration may be given to cat- or anionic size with respect to any particular permeable component.

Extensive bench-scale experiments, consistent with the preceding, were performed to simulate and demonstrate the effectiveness of the cation and anion collection methods described herein. The collection methods were tested with a wide variety of soil media possessing different grain sizes, ion exchange capacities, moisture contents, and contaminant concentrations. As one such example, collection efficiencies with media containing a representative cationic contaminant, cadmium, reached successful levels up to 83%. Providing another example, collection efficiencies with media containing a representative anionic contaminant, selenate, reached successful levels up to 90%. The collection efficiency increased with an increase in the ratio of the delivered charge to the total equivalents of mobile ions in the soil. An apparatus configuration of the type herein, together with present methodology, to collect cationic contaminants is effective in all soils (saturated and unsaturated possessing an appreciable moisture content), but only less so in low permeable soils possessing significant anion exchange capacity. Likewise, the collection of anionic contaminants is effective in all soils (saturated and unsaturated possessing an appreciable moisture content), but only less so in low permeable soils possessing significant cation exchange capacity. Reduced effectiveness in these low permeable soils may be due to accelerated water splitting at bipolar interfaces between the soil medium and the ion exchange membranes.

Without limitation, this invention lends itself to commercial applications involving environmental monitoring and compliance, especially so for those applications already utilizing direct-push capabilities (i.e., trucks equipped with hydraulic/pneumatic rams). For such concerns, only DC power generators, the apparatus and accessories would need to be acquired to supplement existing equipment. As such, this invention provides a useful alternative or adjunct to existing sampling/collection. For example, one clear benefit of the invention is that it involves no drilling or contaminated cuttings, a significant advantage when dealing with hazardous waste sites containing highly toxic ionic contaminants.

While the principles of this invention have been described in connection with specific embodiments, it should be understood clearly that these descriptions are added only by way of example and are not intended to limit, in any way, the scope of this invention. For instance, the methods and/or apparatus of the present invention can be utilized in a wide variety of contaminated media, including without limitation both ground and surface waters. With regard to either an aquifer, lake or body of salt water, an apparatus of the type described herein can employ the present methodologies to sample, collect and/or remove both cationic and anionic contaminants over a range of depths. Other advantages and features would become apparent from the claims hereinafter, with the scope of such claims determined by their reasonable equivalents, as would be understood by those skilled in the art and made aware of this invention.

The invention claimed is:

1. A method of using ionic movement for discrete collection of a cationic contaminant from a medium, said method comprising:
providing an apparatus comprising an anode contacting an aqueous cation source, said anode electrically-connected to a cathode contacting an aqueous electrolyte, said electrolyte having a reduction potential greater than the reduction potential of water, each of said anode and cathode proximate a cation permeable component;

inserting said apparatus into a contaminated medium comprising a cationic contaminant, said cation permeable components in conductive contact with said medium;

applying a voltage potential between said anode and said cathode, said voltage sufficient to reduce said cathodic electrolyte, oxidize said anodic water and move said anodic cation into said medium; and collecting said cationic contaminant moved from said medium toward said cathode.

2. The method of claim 1 wherein said cathodic electrolyte comprises a protic acid.

3. The method of claim 2 wherein said anodic aqueous cation source is a protic acid, and said anodic cation is hydrogen ion.

4. The method of claim 3 wherein said cathodic electrolyte comprises hydrochloric acid.

5. The method of claim 4 wherein said hydrochloric acid has an aqueous concentration, and the Donnan potential of said cation permeable component is substantially unaffected by said acid concentration.

6. The method of claim 1 further including adjustment of at least one of medium pH and ionic conductivity, said adjustment comprising:

providing an anode contacting an aqueous hydrogen ion source, said anode proximate a cation permeable component, and a cathode contacting an electrolyte comprising a reducible cation and a non-hydroxide anion, said cathode proximate an anion permeable component, each of said electrodes in conductive contact with said medium; and applying a voltage potential between said anode and said cathode, said voltage sufficient to introduce said anodic hydrogen ion and said cathodic anion into said medium.

7. The method of claim 1 wherein said medium comprises soil.

8. A method of using ionic movement for discrete collection of an anionic contaminant from a medium, said method comprising:

providing an apparatus comprising a cathode contacting an aqueous anion source, said cathode electrically-connected to an anode contacting an aqueous electrolyte, said electrolyte having an oxidation potential lower than the oxidation potential of water, each of said anode and cathode proximate an anion permeable component;

inserting said apparatus into a contaminated medium comprising an anionic contaminant, said anion permeable components in conductive contact with said medium;

applying a voltage potential between said anode and said cathode, said voltage sufficient to reduce cathodic water, oxidize said anodic water and move said cathodic anion into said medium; and collecting said anionic contaminant moved from said medium toward said anode.

9. The method of claim 8 wherein said anodic electrolyte comprises a protic acid.

10. The method of claim 9 wherein said cathodic aqueous anion source is a hydroxy base and said cathodic anion is hydroxide ion.

11. The method of claim 10 wherein said anodic electrolyte comprises nitric acid.

12. The method of claim 11 wherein said nitric acid has an aqueous concentration, and the Donnan potential of said anion permeable component is substantially unaffected by said acid concentration.

13. The method of claim 8 further including adjustment of at least one of medium pH and ionic conductivity, said adjustment comprising:

providing a cathode contacting an aqueous hydroxide ion source, said cathode proximate an anion permeable component, and an anode contacting an electrolyte comprising an oxidizable anion and a non-hydrogen cation, said anode proximate a cation permeable component, each of said electrodes in conductive contact with said medium; and applying a voltage potential between said anode and said cathode, said voltage sufficient to introduce said cathodic hydroxide ion and said anodic cation into said medium.

14. The method of claim 8 wherein said medium comprises soil.

15. A method of using redox potential for discrete collection of an ionic contaminant from a medium, said method comprising:

providing an apparatus comprising a first electrode contacting an aqueous electrolyte having one of a reduction potential greater than water and an oxidation potential less than water, a second electrode electrically-connected to said first electrode, each of said electrodes proximate an ion permeable component;

inserting said apparatus into a contaminated medium comprising an ionic contaminant, said ion permeable components in conductive contact with said medium; and applying a voltage potential between said electrodes sufficient to collect said ionic contaminant at one of said electrodes.

16. The method of claim 15 wherein said first electrode is a cathode and said electrolyte has a reduction potential greater than the reduction potential of water.

17. The method of claim 16 wherein said cathodic electrolyte comprises a protic acid.

18. The method of claim 17 wherein said electrolyte comprises hydrochloric acid.

19. The method of claim 16 wherein said contaminant is cationic and collected at said cathode substantially without a medium solvent component.

20. The method of claim 15 wherein said first electrode is an anode and said anodic electrolyte has an oxidation potential less than the oxidation potential of water.

21. The method of claim 20 wherein said anodic electrolyte is a protic acid.

22. The method of claim 21 wherein said electrolyte is nitric acid.

23. The method of claim 20 wherein said contaminant is anionic and collected at said anode substantially without a medium solvent component.

24. An apparatus for in situ collection of ionic media contaminants from a medium, comprising:

an anode compartment comprising an anode therein and an ion permeable component thereabout, a cathode compartment comprising a cathode therein and an ion permeable component thereabout, said compartments removably insertable within a contaminated medium, said electrodes in conductive communication with each other, said ion permeable components each configured for contact with said medium and each said electrode contacting an electrolyte.

25. The apparatus of claim 24 wherein each of said permeable components comprises a cation exchange membrane, said apparatus arranged and configured for collection of a cationic contaminant in said cathode compartment.

26. The apparatus of claim 25 wherein said anodic electrolyte comprises an aqueous cation source, and said cationic electrolyte has a reduction potential greater than the reduction potential of water.

27. The apparatus of claim 25 further comprising a second cathode compartment with a cathode therein and an ion permeable component thereabout, said component comprising an anion exchange membrane, said component configured for contact with said medium, said second cathode contacting an electrolyte and electrically-connected to said anode.

28. The apparatus of claim 27 wherein said second cathode electrolyte comprises an acid and a non-hydroxide conjugate base.

29. The apparatus of claim 24 wherein each of said permeable components comprises an anion exchange membrane, said apparatus arranged and configured for collection of an anionic contaminant in said anode compartment.

30. The apparatus of claim 29 wherein said cathodic electrolyte comprises an aqueous anion source, and said anodic electrolyte has an oxidation potential lower than the oxidation potential of water.

31. The apparatus of claim 29 further comprising a second anode compartment with an anode therein and an ion permeable component thereabout, said component comprising a cation exchange membrane, said component configured for contact with said medium, said second anode contacting an electrolyte and electrically-connected to said cathode.

32. The apparatus of claim 31 wherein said second anode electrolyte comprises a base and a non-hydrogen conjugate acid.

33. The apparatus of claim 24 further comprising a voltage source electrically-connected to said electrodes, and a media penetration component distal to said source.

* * * * *